United States Patent [19]
Ekholm et al.

[11] Patent Number: 5,529,019
[45] Date of Patent: Jun. 25, 1996

[54] ANIMAL COLLAR WITH REMOVABLE INSECT STRIP

[76] Inventors: Christopher Ekholm, 7220 Osa Ave. #220, Canoga Park, Calif. 91306; Martin Reznik, 841 Lincoln Blvd, Apt. C, Santa Monica, Calif. 90403

[21] Appl. No.: 320,876

[22] Filed: Sep. 29, 1994

[51] Int. Cl.⁶ .......................... A01K 13/00; A01K 27/00
[52] U.S. Cl. .................................................... 119/654
[58] Field of Search ................................. 119/860, 861, 119/863

[56] References Cited

U.S. PATENT DOCUMENTS

| | | | |
|---|---|---|---|
| 2,219,569 | 10/1940 | Vanderhoof | 119/860 |
| 2,361,108 | 10/1944 | Johnson | 119/863 |
| 4,266,511 | 5/1981 | Muench | 119/861 X |
| 5,205,832 | 4/1993 | Tuman | 604/179 |

*Primary Examiner*—Robert P. Swiatek
*Attorney, Agent, or Firm*—Roger A. Marrs

[57] ABSTRACT

An animal collar having an elongated, flexible strap with opposite ends mounting detachable fasteners such as prongs, buckles or the like. Adjacent to each end of the strap, there is provided an open-ended pocket. A pest or insect repellent strip is removably carried on the inside of the collar whereby the opposite ends of the strip are insertably received through the opening into the interior of each pocket respectively. Retainer loops are carried on the strap between the pockets maintaining the repellent strip in position on the strap. Leash rings are operably carried on the strap to accommodate a walking leash.

3 Claims, 1 Drawing Sheet

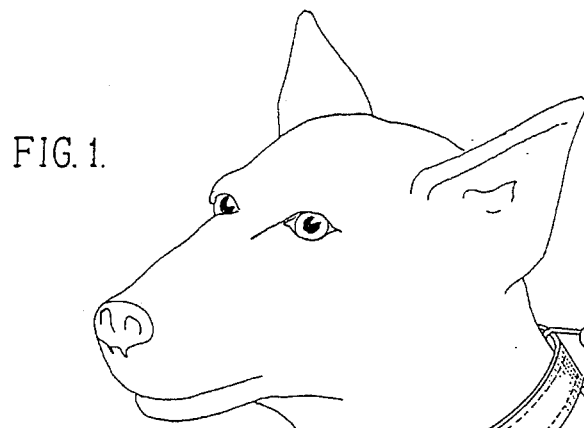
FIG. 1.
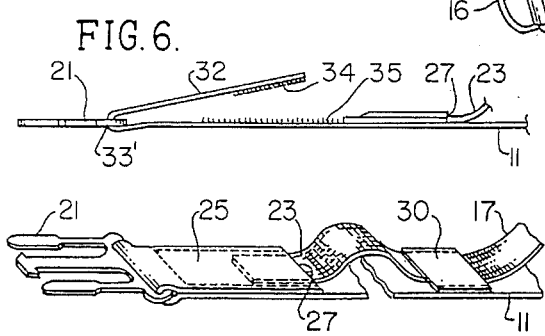
FIG. 6.
FIG. 4.
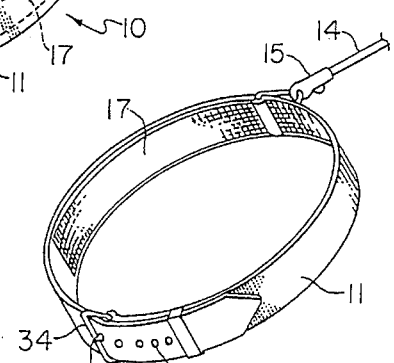
FIG. 5.
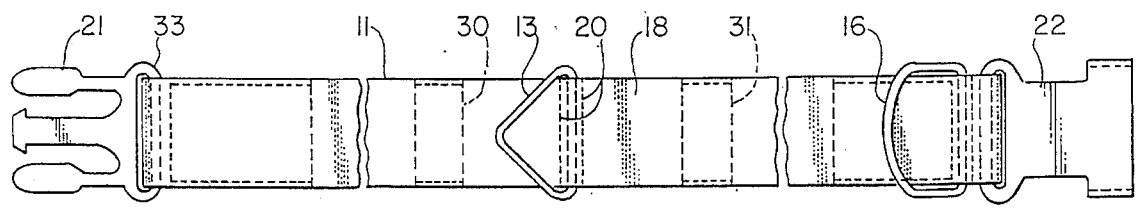
FIG. 2.
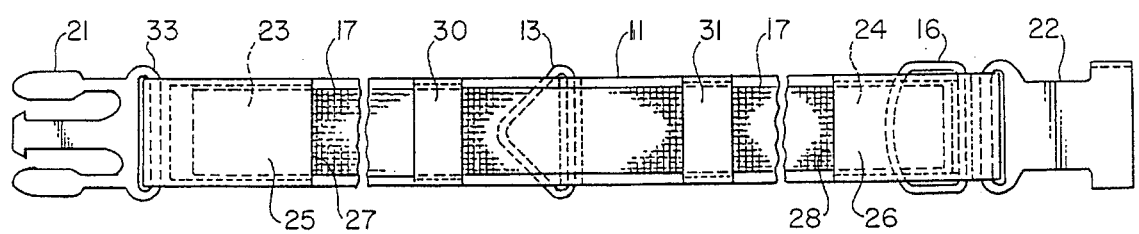
FIG. 3.

5,529,019

ANIMAL COLLAR WITH REMOVABLE INSECT STRIP

BACKGROUND OF THE INVENTION

1. Field of the Invention

The present invention relates to the field of pest or insect repellent or control devices and more particularly to a novel animal collar adapted to carry a removable repellent or control strip on the inside of a collar strap which may be readily detached after a period of time when the repellent or control substances impregnated therein has weakened so as to be non-effective.

2. Brief Description of the Prior Art

In the past, it has been the usual practice to place a collar about the neck of an animal which is impregnated with a pest or insect repellent or control substance so that pests and insects carried on the body of the animal are repelled or controlled. Such prior devices are generally referred to as "flea collars" and are used in addition to collars which are intended to be joined with a leash for animal control purposes such as walking or the like. Therefore, it can be seen that problems and difficulties can be encountered when using two collars about the same animal's neck for achieving two different purposes. The collars tend to bind and damage can occur to either one of the collars due to rivets, fasteners or other construction materials used in the manufacture of the collars.

In some instances, a separate collar is used for either animal restraint or leash purposes or for leash or pest and insect repellent purposes. The repellent or control substance type of collar has a short lived existence and rapidly deteriorates to the point where is is not effective for its intended purpose. At this time, the pest collar is removed and thrown away so that the collar must be replaced by a new collar with fresh substance or ingredients impregnated therein. Such a procedure is costly since it is usual that the collar needs replacement every three to four months and there is no salvage of the original collar.

Therefore, there has been a long-standing need to provide a single collar for achieving insect or pest repellent or control purposes and well as for providing animal control purposes during walking or other procedures. Such a collar should be unitary in its construction so that the collar can be used for animal control purposes and need not be discarded when a change of insect or pest control or repellent substance is needed.

SUMMARY OF THE INVENTION

Accordingly, the above problems are avoided by the present invention which provides a novel combined pest repellent and control collar which includes an elongated strap having opposite ends carrying detachable connection means so that the ends may be readily fastened together about the neck of an animal. The inside of the strap includes a pair of pockets in spaced-apart relationship disposed at the opposite ends of the strap and which include an open entrance facing the midsection of the strap. A repellent strip containing impregnated substance for repelling or controlling pests is detachably carried on the inside of the collar whereby the opposite ends of the repellent strip are insertably received within the pockets via the open entrance thereto. Retaining loops are carried on the strap and retain the repellent strip in position when its opposite ends are within the retainer pockets. Leash rings are provided on the strap at critical locations so that a leash may be detachably connected therewith.

The fastening means for connecting the opposite ends of the strap may take the form of a pronged buckle arrangement or may take the form of a tine buckle arrangement. In some instances, a hook and pile fastener may be employed.

Therefore, it is among the primary objects of the present invention to provide a novel combined animal collar and repellent strip arrangement which includes a means for detachably connecting the repellent strip to the collar so that it may be readily be removed when the repellent ingredient or substance has weakened.

Another object of the present invention is to provide a unitary construction of an animal collar by which a control strap and a pest repellent strip are combined whereby the repellent strip may be readily removed from the control strap when the repellent ingredient or substance is no longer effective.

Still another object of the present invention is to provide a novel animal collar with a readily replaceable pest or insect control strip so that the collar need not be discarded once the pest or insect repellent substance has deteriorated.

Still a further object of the present invention is to provide a novel animal collar with a removable pest or insect repellent strip whereby means are provided for accommodating animal control leashes as well as for providing control of insect and pest presence in the fur of the animal.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of the novel animal collar with the removable pest or insect repellent strip incorporated thereon;

FIG. 2 is an enlarged top plan view of the animal collar illustrated in FIG. 1;

FIG. 3 is an inside view of the animal collar shown in FIG. 2;

FIG. 4 is a fragmentary view, in perspective, showing the insertion of one end of a pest or insect repellent strip into a retaining pocket carried on the collar strap;

FIG. 5 is a front perspective view illustrating the animal collar of the present invention having a tine and buckle arrangement for closing the opposite ends of the collar about the neck of an animal; and FIG. 6 is a fragmentary side elevational view showing the inventive animal collar with adjustment means for animal neck size.

DESCRIPTION OF THE PREFERRED EMBODIMENT

Referring in detail to FIG. 1, the novel animal collar is indicated in the general direction of arrow 10 which includes an elongated flexible strap 11 having a prong-type buckle 12 releasably connecting the opposite ends of the strap. The collar includes a leash ring 13 to which a walking leash 14 may be detachably connected by means of fastener 15. Another accessory ring 16 is provided adjacent to the buckle so that the person controlling the animal will have an additional ring to which the leash may be attached. As indicated in broken lines, a strip 17 is provided which is carried on the inside of the collar and is impregnated with a conventional pest or insert retardant material. In some instances, the material may be toxic for such pests as fleas, ticks or the like, and the particular ingredient employed for impregnating the strip 17 does not form a part of the present invention.

Referring now to FIG. 2, it can be seen that the collar 11 is elongated and includes a midsection 18 to which the leash ring 13 is secured by means of stitching 20 occurring on each side of a central rung of the ring. In this fashion, the ring 13 may pivot as needed, during a walking procedure of the animal. Also, ring 16 is available for use for holding accessories such as name tags, a leash, or other control means. One end of the strap 11 includes a set of prongs 21 forming one-half of a buckle closure, while the other end includes a receptacle 22 for insertably receiving the prongs 21 and such reception is in snap-lock arrangement with fittings within the receptacle. The specific prong fastener does not form a part of the present invention. Preferably, the strap is composed of a flexible long-wearing material such as leather or close meshed fibers. The view of the collar taken in FIG. 2 shows the outside of the collar.

Referring now in detail to FIG. 3, the inside of the collar 11 is illustrated so that it can be seen that the impregnated strip 17 has opposite ends illustrated in broken lines and represented by numerals 23 and 24, which are tucked into pockets 25 and 26 respectively. The pockets 25 and 26 are open-ended so as to provide an entrance 27 leading into pocket 25 and an open entrance 28 leading into pocket 26. In one form, the pockets are formed by providing stitching along the sides and bottom of the pocket. In order to retain the strip 17 in position after its opposite ends have been inserted into the respective pockets, a pair of spaced-apart loops 30 and 31 are provided, which insertably receive the strip 17 therethrough before the ends are tucked into the respective pockets. The strips 30 and 31 may be considered loops through which the strip passes. Preferably, the strip 17 is composed of a porous material which may or may not include fibers such that the pest or insect repellant is impregnated therein. Since the substance has a limited lifetime, it is anticipated that after a given time of use, the substance effectiveness will weaken and deteriorate. By employment of the present invention, it is not necessary to discard the complete collar 11. It need only require that the strip 17 be removed from the collar and replaced by a strip with fresh ingredients.

Referring now to FIG. 4, a view is shown illustrating how the strip 17 is initially inserted through the loops, such as loop 30, followed by tucking the end, such as end 23, into the pocket 25 through the open entrance 27. Once the strip 17 has been flattened against the inside of the collar 11, the collar is ready for use.

In FIG. 5, another closure for joining the opposite ends of the strap or collar 11 is illustrated in which one end of the strap includes a plurality of holes, such as hole 32, into which a tine 33 is placed which cooperates with a square or open buckle 34. The buckle 34 is carried on the end of the strap opposite to its end carrying the holes 32. In this fashion, adjustment can be made so that the collar will fit the neck size of the animal for which the collar is intended to be used.

Therefore, it can be seen that the novel animal collar of the present invention provides a removable pest or insect strip on the inside so that when the ingredients or substance have weakened, the strip may be readily removed from the body of the collar and discarded. The collar may then be used by replacing the removed strip with a new strip having fresh ingredients impregnated therein. A variety of buckles and closure means are envisioned for joining the opposite ends of the collar strap.

FIG. 6 illustrates an adjustment means for accommodating the neck size of the animal. The strap 11 has end 32 that passes through a loop 33 in buckle component 21. A hook and pile fastener having hook material 34 and pile material 35 is detachably joined together at convenient points to provide size accommodation.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An animal collar comprising:
   an elongated strap having opposite ends separated by a mid-section;
   fastening means carried on said strap opposite ends for detachably connecting said strap opposite ends together;
   a pocket carried on each of said strap opposite ends having an entrance leading into the interior of each pocket;
   a strip impregnated with a pest and insect repellent substance and having opposite ends insertably receivable into each of said pockets through said entrance of each of said pockets respectively;
   said strap is of a fixed length and said strip is of a shorter length than said fixed length;
   said strap is provided with an external outside surface and an internal inside surface;
   said pockets disposed on said internal inside surface with said respective entrances facing opposite and opposed to each other; and
   at least one of said strap opposite ends is folded over upon itself about said fastener means to provide at least one of said pockets.

2. The invention as defined in claim 1 wherein:
   said strip is characterized as being short lived and said strap is characterized as being long lived.

3. The invention as defined in claim 2 including:
   adjustment means carried on said strap comprising a hook and pile closure arrangement wherein a selected end of said strap passes through said fastening means and is folded over upon itself to selectively align and attach said hook and pile closure arrangement.

* * * * *